W. E. RICKETSON.

HINGE FOR BOILER FRONTS.

APPLICATION FILED JUNE 26, 1920.

Reissued July 5, 1921. 15,142.

Inventor

William E. Ricketson

By Pane & Carpenter

Attorney

UNITED STATES PATENT OFFICE.

WILLIAM E. RICKETSON, OF NEW YORK, N. Y., ASSIGNOR, BY DIRECT AND MESNE ASSIGNMENTS, TO THE OKADEE COMPANY, OF CHICAGO, ILLINOIS, A CORPORATION OF ILLINOIS.

HINGE FOR BOILER-FRONTS.

15,142. Specification of Reissued Letters Patent. Reissued July 5, 1921.

Original No. 1,299,228, dated April 1, 1919, Serial No. 209,004, filed December 26, 1917. Application for reissue filed June 26, 1920. Serial No. 392,085.

*To all whom it may concern:*

Be it known that I, WILLIAM E. RICKETSON, a citizen of the United States, and a resident of New York, county of New York, and State of New York, have invented a certain new and useful Hinge for Boiler-Fronts; and I do hereby declare that the following is a full, clear, and exact description thereof, reference being had to the accompanying drawings, in which like figures refer to like parts.

This invention relates to an attachment in the form of a hinge for boiler fronts, and the prime feature of the invention is the provision of a structure for supporting the front of a boiler when the front is removed for repair work, such as supplying new flues for the boiler. A further feature of the invention is the provision of means for releasing the boiler front from the stud bolts employed for attaching the front to the boiler, and a further feature of the invention is the provision of means for operating the releasing part of the hinge structure so that the removal of the boiler front may be accomplished with a minimum expenditure of time and labor.

The full nature of the invention will be understood from the accompanying drawings and following description and claims.

Figure 1:
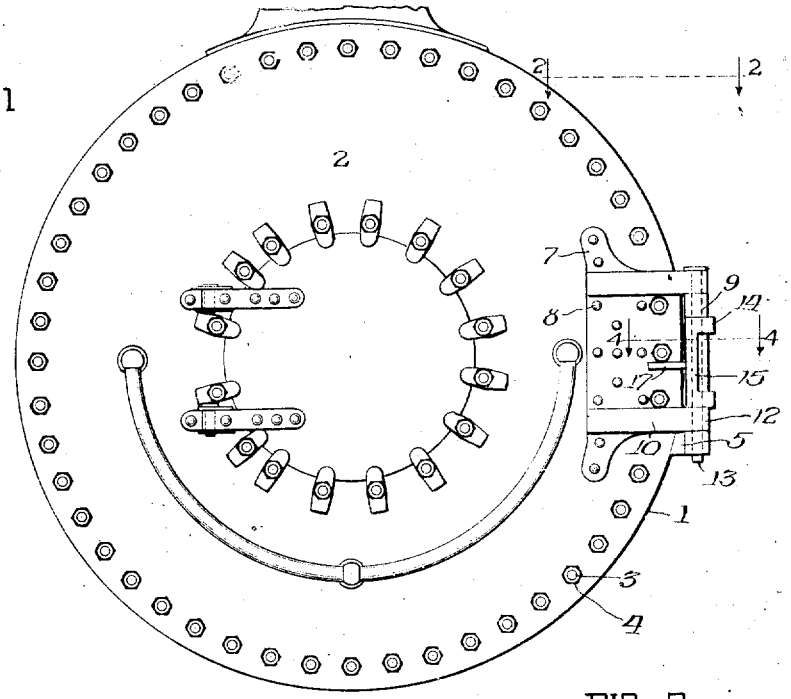
Figure 2:
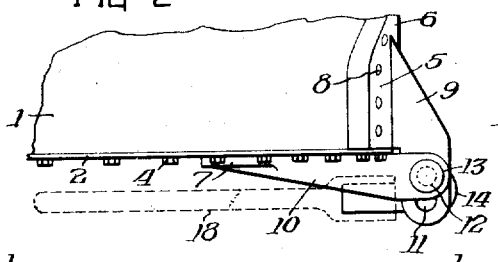
Figure 3:
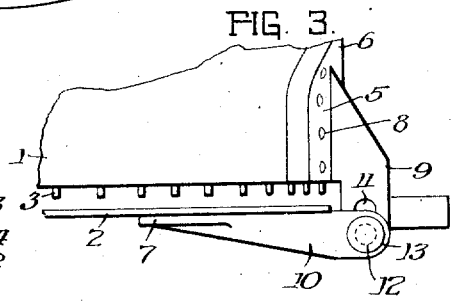
Figure 4:
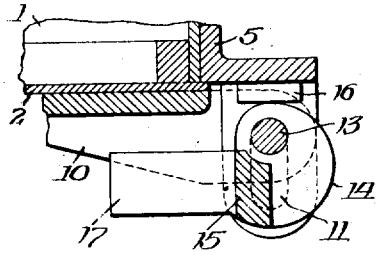
Figure 5:
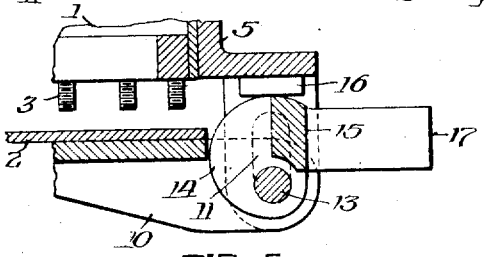

Figure 1 is a front elevation of a locomotive boiler showing the improved hinge structure attached thereto. Fig. 2 is a detail top plan view of the hinge before the same is operated to release the front from the boiler as seen from line 2—2, Fig. 1. Fig. 3 is a similar view showing the position of the hinge after being operated to release the boiler front from the stud bolts. Fig. 4 is a detail sectional view as seen on line 4—4, Fig. 1, showing the parts of the hinge in closed position. Fig. 5 is a similar view showing the parts of the hinge operated to release the front from the stud bolts.

Referring to the drawings in which similar reference numerals designate corresponding parts throughout the several views, 1 indicates a boiler of the usual locomotive type and 2 indicates the front plate or closure for the forward end of the boiler, said front being attached to the boiler preferably by stud bolts 3 and nuts 4, the inner face of the plate and the end of the boiler being so constructed that when bolted together a perfect seal will be formed.

Heretofore when doing repair work within the boiler, such as removing and renewing flues or the like, it has been necessary to employ a crane and shackle for supporting the boiler front and consequently necessitated the placing of the boiler in the shop, in order to have ready access to a crane. The object of this invention, however, is to obviate such trouble and to permit of the boiler being repaired outside of the shop or at any suitable place. To this end an attachment in the form of a hinge structure 5 is provided, comprising a pair of leaves 6 and 7, the leaf 6 being attached to the face of the boiler 1, while the leaf 7 is attached to the front plate 2, said leaves being secured to their respective parts in any suitable manner, as by means of rivets 8 or the like.

The leaf 6 is provided with an upper and lower ear 9 with which coöperates an upper and lower ear 10 on the leaf 7. The ears 9 are provided with elongated slots 11 through which and through openings 12 in the ears 10 extends a pivot bolt 13, and by means of which the leaves are hingedly secured together.

Heretofore much difficulty was encountered in releasing or loosening the boiler front from the end of the boiler, owing to the adhesion of the parts, and to overcome this objectionable feature, means is provided for moving the front 2 outwardly in a substantially straight line to break the connection between the boiler and the front so that an instrument can be readily introduced to force the front outwardly a sufficient distance to be released from the stud bolts. A pair of cams 14 which are connected together by a bar 15, are rotatably mounted on the pivot bolt 13, the faces of said cams being adapted to engage lugs 16 on the leaf 6 of the hinge structure, when the cams are operated to release the front.

Under ordinary circumstances the cams are in the position shown in Fig. 4, thus permitting the front 2 to rest against the end of the boiler 1, but when it is desired to remove the front the cams 14 are rotated to the position shown in Fig. 5 of the drawing, this movement being accomplished by providing the ears 9 with the elongated slots 11. The bar 15 has a shank 17 thereon with which any suitable form of instrument may be engaged for applying leverage to the cams, preferably a socket lever 18, one of which is always present in the cab of the locomotive.

As soon as the front has been released from the stud bolts it can be swung around toward the side of the boiler and out of the road of any one working within the boiler or in front of the boiler.

By providing the hinge structure the work of removing and supporting the front of the boiler is very much simplified and the front can be very easily and quickly removed or repositioned over the front of the boiler. While the device is shown and described as applied to a locomotive boiler, it will be clearly understood that it can be used in connection with any boiler structure having a removable front plate in which the invention is of use.

The invention claimed is:

1. A hinge structure for boiler fronts including a horizontal cylindrical circular boiler, a boiler head at right angles thereto, stud bolts carried by the boiler for coöperation with said head and arranged in circular formation, a hinge leaf attached to the boiler, a pair of ears on said leaf, a leaf attached to said head and normally at right angles to the boiler leaf, ears on the latter leaf adapted to rest upon the ears of the first leaf, the ears of the boiler leaf having elongated slots and the ears of the leaf attached to the head having circular openings, a pivot bolt passing through the openings in both sets of ears, a pair of cams surrounding said bolt between the upper ear of the leaf attached to the boiler and the lower ear of the leaf attached to the head, a bar connecting said cams and integral therewith whereby both of said cams will be operated simultaneously, and an operating shank integral with the connecting bar and midway between its ends.

2. A hinge structure comprising a pair of leaves normally at right angles to each other, one of said leaves being curved for engagement with a circular body and the other flat for engagement with a flat surface, a pair of ears on each leaf, the ears of one leaf having elongated slots, a pivot bolt hingedly connecting said leaves, a pair of cams on said bolt one immediately below the upper ear of one leaf and the other immediately above the lower ear of the other leaf adapted to move said bolt and one of the leaves outwardly or inwardly without imparting hinging action to the hinge structure, a bar connecting said cams, and lugs on one leaf for engagement with said cams.

3. In combination with a boiler having an opening for affording access thereto, a closure member for said opening supported on and detachably secured to the boiler by stud bolts and nuts whereby the closure is normally secured in fixed position to close the opening and in which when the nuts are removed the closure member is moved from and out of supported relation to the boiler opening, of an attachment for supporting said closure from said boiler after said closure has been moved out of the supported relationship to the boiler effected by said first mentioned supporting and securing means.

4. In combination with a boiler having an opening affording access thereto, a closure member for said opening and means interposed between the boiler and the closure member whereby the closure member may be fixed in supported relation to the boiler and slidably detached therefrom, of an auxiliary attachment serving to attach the closure member to the boiler, permit such sliding movement and support the closure member after such sliding movement of the closure member relatively to the boiler is effected.

5. In combination with a boiler having an opening affording access thereto, a closure member for said opening, means for supporting and holding said closure member in fixed position to close said opening, of auxiliary means for supporting the closure member from the boiler after the closure member has been moved from its position of closing said opening.

6. In combination with a boiler having an opening affording access thereto, a closure member for said opening, means for supporting and holding said closure member in fixed position to close said opening, of an auxiliary means for additionally supporting said closure from said boiler while said closure is in the supported relationship to the boiler effected by said first mentioned holding means, and also after said closure has been moved out of said first mentioned supported relationship to the boiler.

7. In a structure of the character described, in combination, a boiler having its front end open, a closure for such open front end and substantially of the dimensions thereof, means carried from the boiler side arranged and constructed to support said closure for successive bodily and angular movement relatively to the boiler front.

WILLIAM E. RICKETSON.

Witnesses:
PAUL CARPENTER,
LOUIS L. SCHER.